United States Patent [19]

Orthmann et al.

[11] Patent Number: 5,602,538
[45] Date of Patent: Feb. 11, 1997

[54] APPARATUS AND METHOD FOR IDENTIFYING MULTIPLE TRANSPONDERS

[75] Inventors: Kurt Orthmann, Munich; Andreas Hagl, Dachau, both of Germany

[73] Assignee: Texas Instruments Incorporated, Dallas, Tex.

[21] Appl. No.: 282,096

[22] Filed: Jul. 27, 1994

[51] Int. Cl.⁶ .................................................. H04B 7/00
[52] U.S. Cl. .......................... 340/825.54; 340/825.49; 340/572; 342/44; 342/51
[58] Field of Search ................ 340/825.49, 825.54, 340/572, 825.31; 342/44, 51

[56] References Cited

U.S. PATENT DOCUMENTS

| | | | |
|---|---|---|---|
| 4,333,072 | 6/1982 | Beigel | 340/825.54 |
| 4,510,495 | 4/1985 | Jigrimis et al. | 340/825.54 |
| 4,931,788 | 6/1990 | Creswick | 340/825.72 |
| 4,952,928 | 8/1990 | Carroll et al. | 340/825.54 |
| 5,041,826 | 8/1991 | Milheiser | 340/825.54 |
| 5,053,774 | 10/1991 | Schuermann et al. | 342/44 |
| 5,124,699 | 6/1992 | Teryoert et al. | 342/44 |
| 5,227,803 | 7/1993 | O'Connor et al. | 342/51 |
| 5,235,326 | 8/1993 | Beigel et al. | 340/825.54 |
| 5,294,931 | 3/1994 | Meier | 342/44 |
| 5,302,954 | 4/1994 | Brooks et al. | 342/51 |
| 5,339,073 | 8/1994 | Dodd et al. | 340/825.31 |
| 5,347,263 | 9/1994 | Carroll et al. | 340/825.54 |

FOREIGN PATENT DOCUMENTS

| | | | |
|---|---|---|---|
| 0299557 | 1/1989 | European Pat. Off. | |
| 2077555 | 12/1981 | United Kingdom | 340/825.54 |
| 935561 | 8/1993 | WIPO | 340/825.54 |

*Primary Examiner*—Brian Zimmerman
*Assistant Examiner*—William H. Wilson, Jr.
*Attorney, Agent, or Firm*—Rebecca A. Mapstone; James C. Kesterson; Richard L. Donaldson

[57] ABSTRACT

Apparatus and method of identifying a plurality of transponders (10–16) entering into an inquiry field (18) of an interrogation unit (20) are provided. The transponders (10–16) are each assigned a unique identification code. Upon receipt of an interrogation pulse from the interrogation unit (20), each transponder (10–16) responds with its respective identification code. Depending on the spatial distance of each transponder (10–16) with respect to the interrogation unit (20), the interrogation unit (20) detects and receives the strongest response. The received identification code is stored. The interrogation unit (20) repeatedly sends interrogation pulses containing any stored identification code until all of the transponders (10–16) are identified and read.

9 Claims, 3 Drawing Sheets

APPARATUS AND METHOD FOR IDENTIFYING MULTIPLE TRANSPONDERS

TECHNICAL FIELD OF THE INVENTION

This invention relates in general to the field of transponders. More particularly, the present invention relates to apparatus and method for identifying multiple transponders located in far proximity with one another.

BACKGROUND OF THE INVENTION

Transponder arrangements have been used to detect and uniquely identify, in a contactless manner, objects, animals, or persons being present at selected locations. Transponder systems typically include an interrogation unit which transmits radio frequency pulses and a plurality of transponders which receive the pulses and respond with stored data in the form of a modulated radio frequency carrier. Because the transponders may be diminutive in size, transponder systems may be used in countless applications. For example, luggage being transported on a conveyor belt may be identified and routed according to the encoded destination at a routing point. Machine components may be identified and transported to specific stations on an assembly line. Patterns of movement and activity of animal stock embedded with transponder units may be monitored and recorded in an unobtrusive manner. Personnel may carry identification badges having a transponder unit to gain access to secured areas without having to use a card reader.

However, a problem arises when multiple transponder units are present within the inquiry field of an interrogation unit. If multiple transponder units exist in the inquiry field and respond simultaneously to the interrogation pulses of the interrogation unit, only the transponder unit with the strongest field strength and characteristic is detected and identified. As a result, usually the transponder unit located nearest the interrogation unit is identified. Since other transponders farther from the interrogation unit are not detected, errors result.

Accordingly, a need has arisen for resolving the problem of detecting multiple transponder units located in far proximity with one another in the inquiry field of an interrogation unit.

SUMMARY OF THE INVENTION

In accordance with the present invention, apparatus and method for identifying multiple transponders are provided which eliminates or substantially reduces the disadvantages associated with prior systems.

In one aspect of the invention, apparatus and method of identifying a plurality of transponders entering into an inquiry field of an interrogation unit are provided. The transponders are each assigned a unique identification code. Upon receipt of an interrogation pulse from the interrogation unit, each transponder responds with its respective identification code. Depending on the spatial distance of each transponder with respect to the interrogation unit, the interrogation unit detects and receives the strongest response. The received identification code is stored. The interrogation unit repeatedly sends interrogation pulses containing any stored identification code until all of the transponders are identified and read.

In another aspect of the invention, the interrogation unit stores the identification codes and maintains them in memory for a predetermined period of time. The identification codes are deleted after this period of time to ensure a re-entry into the inquiry field is detected.

BRIEF DESCRIPTION OF THE DRAWINGS

For a better understanding of the present invention, reference may be made to the accompanying drawings, in which.

DETAILED DESCRIPTION OF THE INVENTION

The preferred embodiment of the present invention and its advantages are best understood by referring to FIGS. 1–5 of the drawings, like numerals being used for like and corresponding parts of the various drawings.

Figure 1:
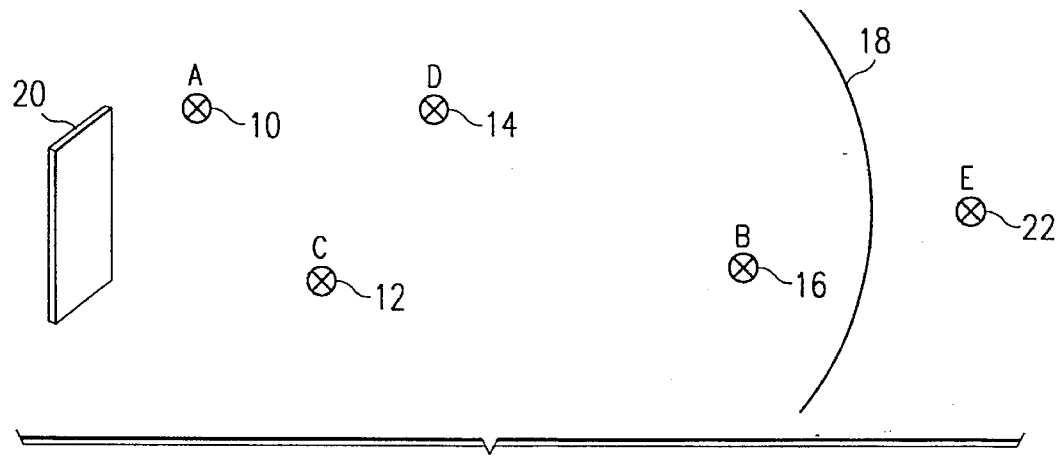
FIG. 1 is a simplified diagram showing multiple transponders located in an inquiry field of an interrogation unit.

FIG. 1 illustrates an exemplary scenario of multiple transponders 10–16, with identification codes A through D, being present in an inquiry field 18 of an interrogation unit 20. As shown, the spatial distance from interrogation unit 20 to each of the transponders are unequal, with transponder 10 being the closest and transponder 16 being the farthest inside inquiry field 18. Inquiry field 18 represents the area within which the interrogation or power pulses generated by interrogation unit 20 are readily receivable. Inquiry field 18 may contain a continuous modulated or unmodulated radio frequency signal. Transponders 10–16 are capable of receiving the interrogation pulses from interrogation unit 20 and respond thereto with stored data and their respective identification codes. As shown, a transponder 22 located outside of inquiry field 18 does not receive the interrogation pulse and therefore does not participate in transmission of its stored data.

In a typical transponder arrangement, interrogation unit 20 sends an RF interrogation pulse. The interrogation pulse energizes a transponder located within the inquiry field, and enables it to respond with stored data. However in the scenario shown in FIG. 1, transponders 10–16 receive the interrogation pulse and responds thereto substantially simultaneously. Since transponder 10 is the closest in spatial relationship to interrogation unit 20, its response has the highest field strength and is therefore recognized by interrogation unit 20 while the responses of transponders 12–16 are ignored. Accordingly, the presence of transponders 12–16 are not properly detected.

Figure 2:
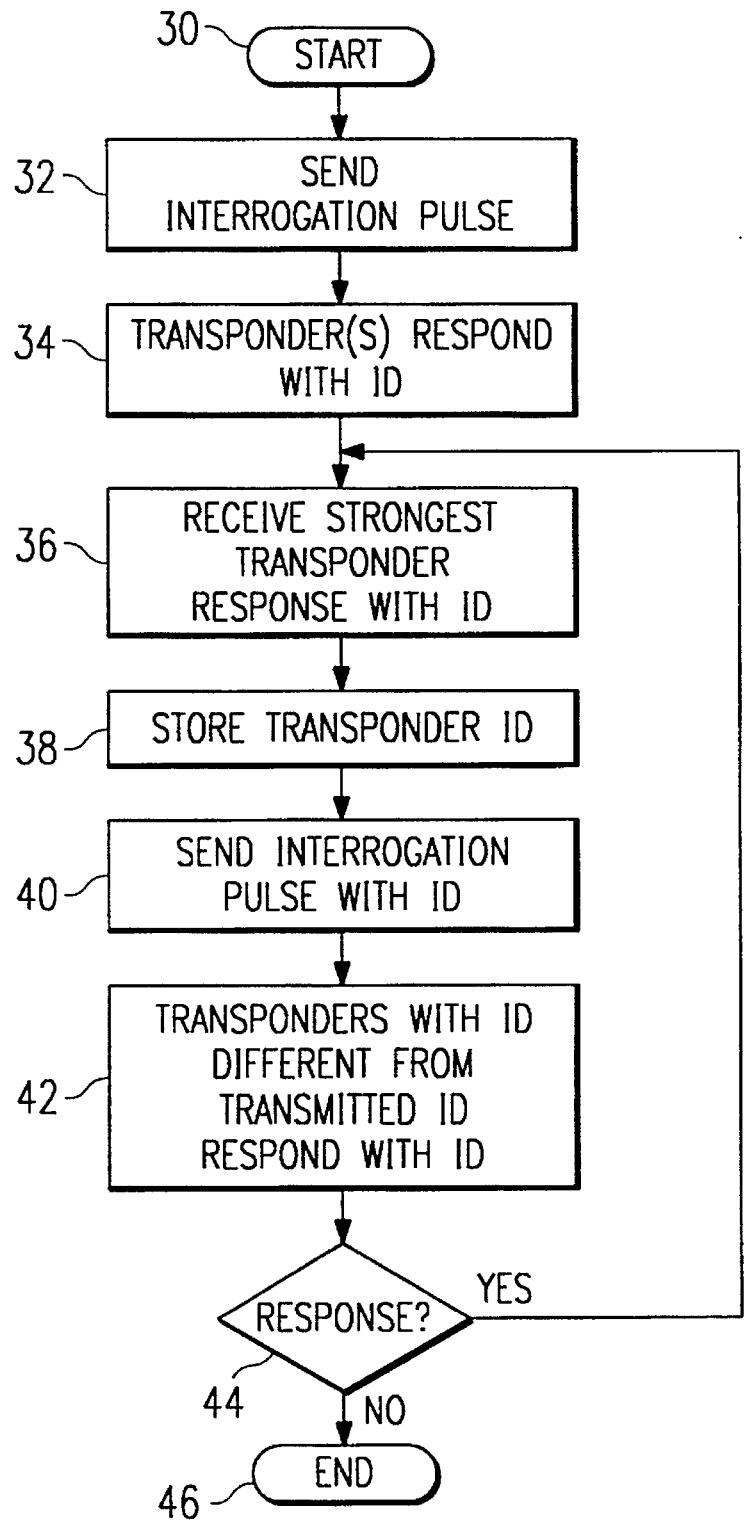
FIG. 2 is a simplified flowchart of the process of selectively reading the multiple transponders.
Figure 3:
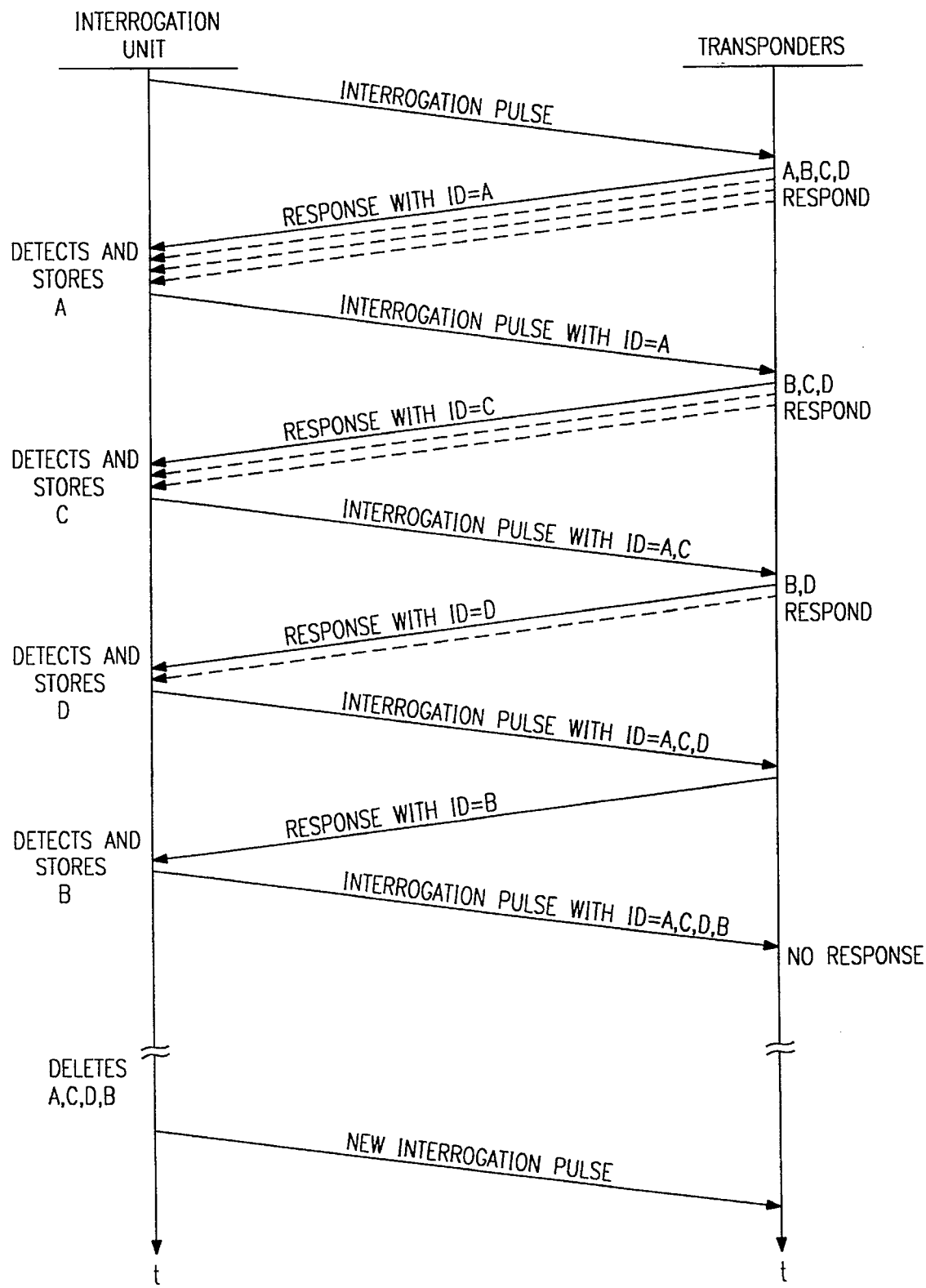
FIG. 3 is a data flow and time line of the same process.

Referring also to FIGS. 2 and 3, the procedure by which multiple transponders located within inquiry field 18 of interrogation unit 20 are identified is shown in a flowchart and a time sequence chart. Interrogation unit 20 begins by sending an interrogation pulse, as shown in blocks 30 and 32. In response, each transponder 10–16 located in inquiry field 18 sends a reply which includes some data stored therein and a unique identification code, A though D, as shown in block 34. In an embodiment of the present invention, the identification codes may be a 64-bit bit string. However, in most applications only the transmission of a small number of the least significant bits of the identification code is required to uniquely identify all of the transponders.

In the exemplary scenario shown in FIG. 1, interrogation unit 20 detects and receives the response of transponder 10 and its identification code, A, since it is the closest in proximity and therefore its field characteristic is probably the strongest. In blocks 38 and 40, interrogation unit 20 stores identification code A of transponder 10, and again sends an interrogation pulse. This time, the interrogation pulse includes the stored identification code of transponder 10. The inclusion of the identification code in effect acknowledges the receipt of transponder 10's response and identification thereof.

Upon receipt of the interrogation pulse, transponders 12–16 respond since their respective identification codes are different from the code included in the interrogation pulse, as shown in block 42. This time since transponder 12 is the closest to interrogation unit 20, its response with its identification code is recognized by interrogation unit 20. The inquiry in block 44 to determine whether there are any transponders within inquiry field 18 is therefore answered in the affirmative. Transponder 12 is identified and its identification code, C, is stored, as shown in blocks 36 and 38. Interrogation unit 20 continues to transmit interrogation pulses with stored identification codes, as shown in blocks 40–44 and in FIG. 3 until it identified transponders 14 and 16 and thereafter receives no further response. Since transponder 22 remains out of the range of inquiry field 18, it does not receive the interrogation pulses and therefore does not respond.

As shown in FIG. 3, at the end of a predetermined time period after the detection of transponders 10–16, interrogation unit 20 deletes the stored identification codes from its memory. Preferably, the identification codes are stored in chronological order so that each code may be deleted at the expiration of the time period. For example, a first-in-first-out queue of a predetermined capacity, c, may be used to store the identification codes. When the c+1th transponder is identified, the first transponder that was identified is deleted from the queue.

The length of the predetermined time period and/or the capacity of the queue is largely dependent on the application of the transponder system. For example, if it is expected that the transponders may move into and out of the inquiry field within a short amount of time, and that it is desirable to identify these transponders each time they enter the inquiry field, then the time period and queue capacity are set accordingly to more accurately reflect this pattern of movement. On the other hand, if the transponders tend to move into the inquiry field and remain for a longer period of time, then the time period and queue capacity are set to accommodate the longer linger time. Alternatively in the same scenario, storage time and general length may be short to detect the linger time of each transponder and timers may be used to measure the linger time.

Figure 4:
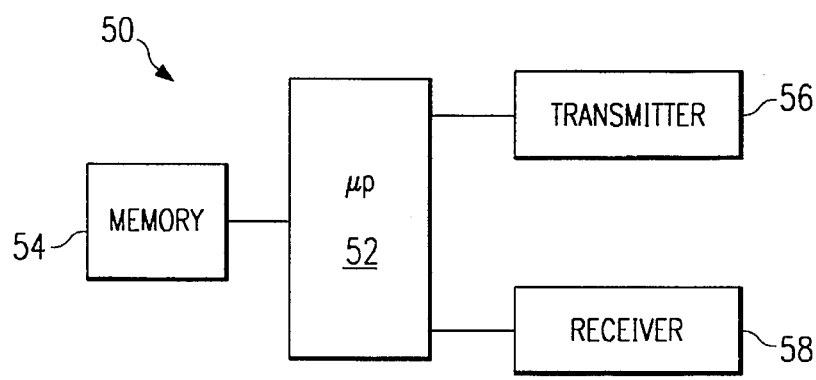
FIG. 4 is a simplified block diagram of an interrogation unit.

Referring to FIG. 4, a simplified block diagram of an embodiment of an interrogation unit 50 is shown. Interrogation unit 50 includes a microprocessor 52 which is responsible for the control of the function sequences. Microprocessor 52 is coupled to a memory 54, which may include the aforementioned queue used for storing the identification codes of recognized transponders. Further included are a transmitter 56 and receiver 58. Transmitter 56 and receiver 58 may include a radio frequency (RF) oscillator (not shown) and a resonant circuit (not shown) the construction and operation thereof are described in U.S. Pat. No. 5,053,774, titled *Transponder Arrangement*, issued to Schuermann et al. on Oct. 1, 1991.

Figure 5:
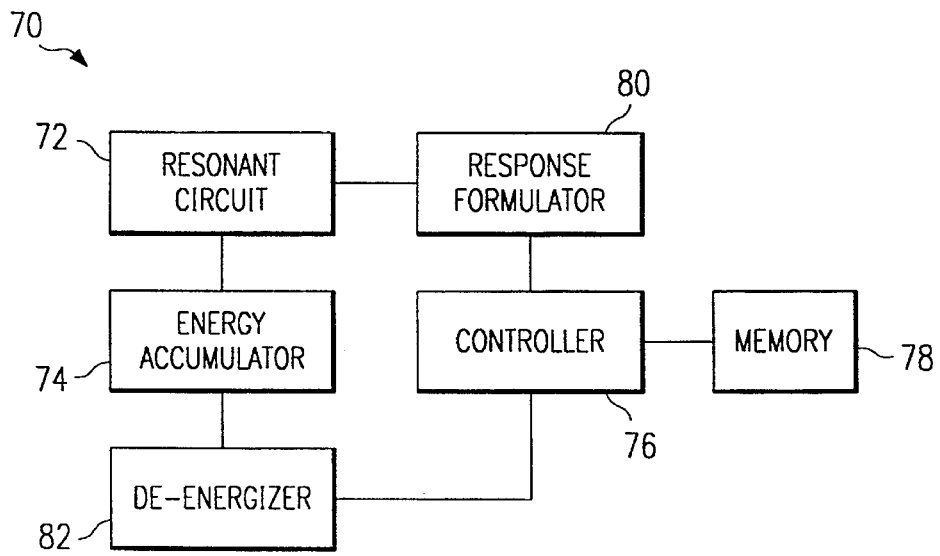
FIG. 5 is a simplified block diagram of a transponder.

FIG. 5 is a simplified block diagram of an embodiment of a transponder 70. Transponder 70 includes a resonant circuit 72 coupled to an energy accumulator 74. Resonant circuit 72 may include a receiving coil (not shown) coupled in parallel with a first capacitor (not shown). Energy accumulator 74 may include a second capacitor (not shown) coupled in series with resonant circuit 72. A controller 76 with memory 78 are also provided. Controller 76 may receive input signals from a sensor (not shown) indicative of certain physical parameters of the environment, for example ambient temperature and pressure, and store it in memory 78 for transmission to the interrogation unit. The unique identification code of the transponder also may be stored in memory 78. In addition, a response formulator 80 may read memory 78 to formulate the code pattern responses to the interrogation pulses. A de-energizer circuitry 82 controlled by controller 76 is further provided for shorting, de-energizing, or bypassing energy accumulator 74 in response to receiving an interrogation pulse containing its identification code. De-energizer circuitry 82 therefore acts to suppress the transponder's response so that it may not respond to the interrogation pulse. Details of the transponder circuitry are described in above-identified U.S. Pat. No. 5,053,774, titled *Transponder Arrangement*.

Although the present invention and its advantages have been described in detail, it should be understood that various changes, substitutions and alterations can be made therein without departing from the spirit and scope of the invention as defined by the appended claims.

What is claimed is:

1. A method of identifying a plurality of transponders entering into an inquiry field of an interrogation unit, the method comprising the steps of:

assigning a unique identification code to each of said plurality of transponders;

generating and sending an interrogation pulse, said interrogation pulse including any identification code stored in an interrogation unit memory;

receiving said interrogation pulse and comparing said identification code therein with said unique identification code;

sending a response to said interrogation pulse if said identification codes are not equal, said response including said unique identification code;

receiving a recognizable response from said plurality of transponders and storing said identification code included therein, wherein said recognizable response is the response with the greatest field strength.

2. The method, as set forth in claim 1, further comprising the step of deleting each stored identification codes after a predetermined period of time.

3. The method, as set forth in claim 1, wherein said identification code storing step includes the step of storing said identification code in a sequential memory.

4. The method, as set forth in claim 1, further comprising the step of continuing to generate and send said interrogation pulses including said stored identification codes.

5. A method for identifying multiple transponders located within an inquiry field of an interrogation unit, comprising the steps of:

assigning a unique identification code to each of said multiple transponders;

generating and sending an interrogation pulse;

receiving a recognizable response to said interrogation pulse from an identified transponder when said transponder fails to recognize it's own identification code in the interrogation pulse and, wherein said response includes an identification code and said recognizable response is the response with the greatest field strength;

storing said received identification code;

generating and sending another interrogation pulse including said stored identification code and deactivating said identified transponder; and repeating the identification code receiving and storing step, and the interrogation pulse generating and sending step until all of said multiple transponders present in said inquiry field are identified.

6. The method, as set forth in claim 5, further comprising the step of deleting said stored identification code after a predetermined time period of storage.

7. The method, as set forth in claim 5, wherein said identification code storing step includes the step of sequentially storing said identification code according to a chronology of detection.

8. The method, as set forth in claim 5, wherein said identification code storing step includes the step of storing said identification code in a queue.

9. The method, as set forth in claim 5, further comprising the steps of:

said transponders receiving an interrogation pulse from said interrogation unit, said interrogation pulse including stored identification code;

each transponder comparing said received identification code with its own unique identification code; and responding to said interrogation pulse only if said received identification code does not match said own unique identification code.

* * * * *